Sept. 23, 1952  L. CALMELS  2,611,389
AUTOMATIC VALVE
Filed Dec. 29, 1947
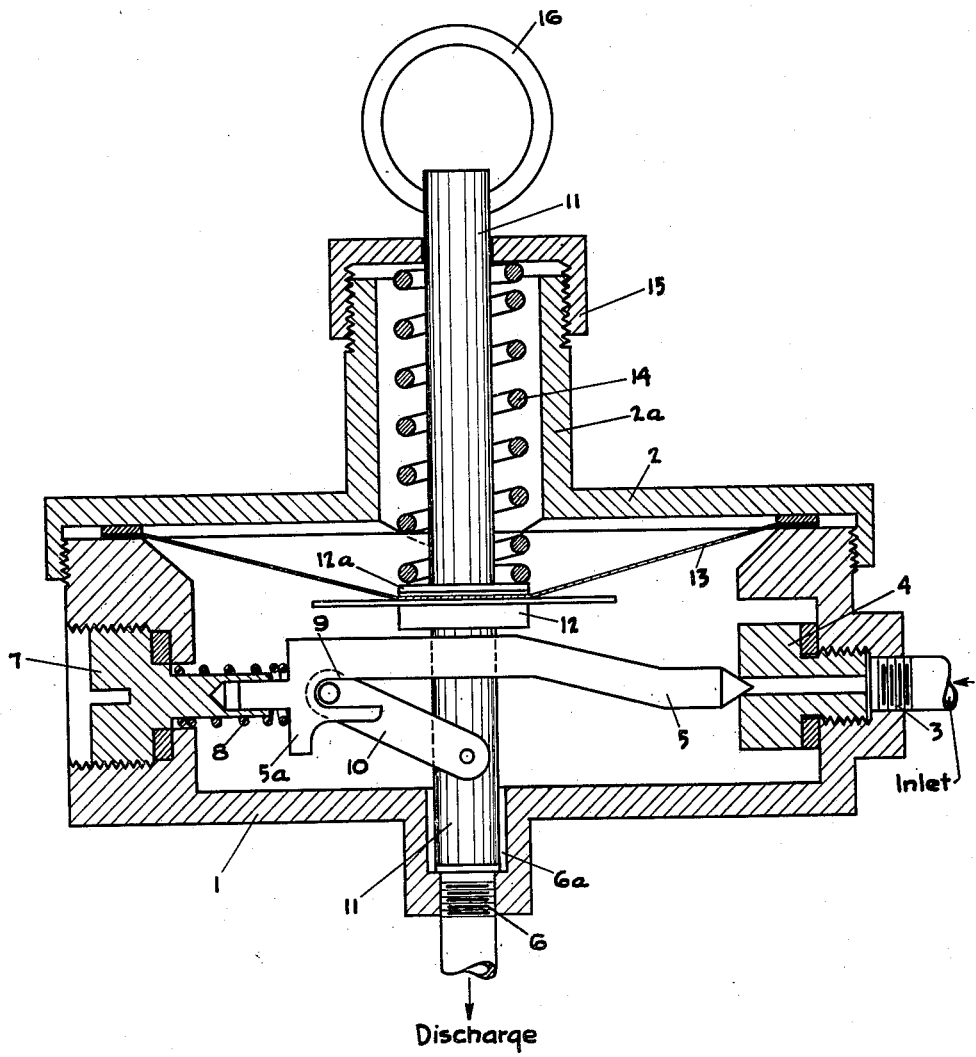
Discharge
Inventor: Louis Calmels
by *Oswald H. Wilmore*
His Attorney Patented Sept. 23, 1952

2,611,389

UNITED STATES PATENT OFFICE 2,611,389

AUTOMATIC VALVE

Louis Calmels, Paris, France, assignor to Shell Development Company, San Francisco, Calif., a corporation of Delaware Application December 29, 1947, Serial No. 794,409
In France January 6, 1947

1 Claim. (Cl. 137—463)

This invention relates to improvements in valves for automatically closing the passage of a fluid upon a decrease in fluid pressure. The embodiments described herein have been designed particularly for use as safety valves in gas lines for automatically isolating a portion of the gas system when a failure occurs downstream of the valve; however, I desire to be understood that such valves may be employed in any environment where it is desired to stop a flow of a fluid upon a drop in the pressure thereof.

It is an object of the invention to provide a valve which will automatically close the flow of fluid in the event of a drop in the pressure of such fluid.

It is a further object to provide an automatic valve, adapted to be connected in a conduit system, which may be cocked or opened manually, is thereafter held open by the pressure of the fluid acting upon a pressure responsive element, and closes positively by the action of an independent resilient element when such fluid pressure is reduced. Ancillary thereto, it is an object to provide an automatic valve of the type described wherein the valve is held open against the closing force of a valve spring by means of a crank rod when the fluid pressure maintains a control spindle in one position, and wherein the crank rod is released to permit the valve spring to close the valve when the pressure is released.

A specific object is to provide an automatic safety valve for isolating a portion of a gas system wherein the flow of gas is stopped completely when a rupture or some heavy leakage occurs downstream of the valve.

With the foregoing and other objects in view, the invention resides in the combination of a valve, a pressure responsive element rod, and connecting crank rod, one specific embodiment of which is shown in the accompanying drawing, forming a part of this specification which is a cross-sectional view of the valve.

The automatic valve comprises a chamber having passages for connection to the inlet and outlet conduits and having associated therewith a pressure responsive element, such as a diaphragm, piston, bellows or the like, urged outwardly from the chamber by fluid pressure therein and urged inwardly by a back pressure spring which may be adjustable. A valve is interposed between the inlet and outlet conduits and may have a movable head cooperating with a valve seat on either conduit; in the preferred embodiment, however, the valve seat is at or near the end of the inlet passage so as to prevent the admission of fluid into the chamber when the valve is seated. The valve is provided with a spindle and a valve spring urging it toward its seat. A bolting device is connected to the valve spindle so as to maintain the valve away from its seat whenever the pressure responsive element is maintained in its outward position. This bolt may be pivoted to the valve spindle or to a part of the pressure responsive element or to both. The parts are so arranged that the valve is cocked when the pressure responsive element is pulled outwardly by any mechanical force, e. g., manually, against the force of the back pressure spring. In this cocking movement the bolting device opens the valve against the action of the valve spring and maintains it in its open position.

The bolting device preferably consists of a small crank rod or link one end of which is slidably fitted within a short slide in the valve spindle and the other end of which is pivotally connected to a block or control rod movable in a direction transverse to the spindle axis. Such block or actuating rod is connected for movement by the pressure responsive element, either directly or through suitable linkage. The pivot point is so located that when the pressure responsive element is in its outer position the pivot point is in substantially a line with the axis of movement of the valve spindle. If, on account of some leakage, the pressure inside of the chamber decreases to an abnormally low value, the back pressure spring overcomes the force of the fluid against the pressure responsive element, moving the latter inwardly and the pivot point out of line with the valve spindle axis; this frees the valve spindle by eliminating the block effect of the crank rod and permits the valve to move to its seat, thereby closing the flow of fluid.

Referring to the single figure, the valve is shown to be housed in a cylindrical, gas-tight case 1, the upper part of which is sealed by a lid 2 which is fitted tightly to the case 1 but has a neck 2a the top of which is not gas-tight. The gas-feed line or inlet conduit is connected to an opening 3 so as to discharge into the side of the case 1 through a bushing 4 which forms a valve seat for the needle valve 5. The gas-discharge line or discharge conduit is connected to an opening at the end of a neck 6. This opening is formed in the vertical axis of the case 1. The spindle of the valve 5 can be moved longitudinally and slides within a bearing 7 formed as a plug screwed into the opposite wall of the casing. A valve spring 8 is provided between the bearing 7 and a shoulder 5a on the valve spindle, so as to urge the valve 5 to its seat 4 for shutting off the flow of gas from the gas-feed line. The valve spindle is formed with an axial notch 9 forming a slide-way in which a transverse, circular stud on the crank rod 10 is slidable. The shoulder 5a, with its notch 9, forms a control member for the valve 5. The other end of the rod 10 is pivotally mounted by a similar stud to a block or control rod 11 which is vertically movable, i. e., transverse to the axis of travel of the valve spindle. The rod 10 is shown to be a single link mounted on one side of the rod 11 and valve spindle, but a pair of such links, one on either side of the rod, may be provided. The control rod 11 is supported laterally within the neck 6; the latter is formed with longitudinal grooves 6a so as to permit the flow of gas through it.

The pressure responsive element comprises discs 12 and 12a, suitably secured to the rod 11 and sealed to a diaphragm or membrane 13, the rim of which is clamped between the rim of the case 1 and the lid 2 to form a gas-tight joint. A back-pressure spring 14 surrounding the rod 11 bears against the upper disc 12a and against a small lid 15 which is screwed to the top of the neck 2a. The rod 11 protrudes from the lid 15 through an oversize opening (to permit equalization of air pressure between the atmosphere and the space above the diaphragm) and is provided, at the top, with a ring 16.

Operation

When the valve is shut, as shown in the drawing, the control rod 11 and diaphragm 13 are kept in their lowered positions by the action of the back-pressure spring 14. The crank rod 10 is in the oblique position and the axis of the notch 9 is above the pivot point of the crank rod on the control rod 11; hence the rod 10 offers no obstruction to the movement of the valve 5 which is pressed against the seat 4 by the spring 8.

To place the gas-line in operation the valve must be cocked. To achieve this the rod 11 is lifted by means of the ring 16 against the action of the spring 14 until the diaphragm 13 is substantially parallel to the lid 2. The rod 10 is thereby given an angular movement to its horizontal position thereby also moving its sliding end into engagement with the end of the notch 9, moving the valve 5 to its open position and compressing the spring 8. When the rod 10 is horizontal, i. e., when its pivoted end is in line with the axis of movement of the valve spindle, the latter is bolted. During the opening of the valve gas under pressure flows into the case 1; this acts upon the diaphragm 13 and keeps it flat against the lid 2.

In the event of a leakage or rupture in the line downstream from the valve, the pressure in the chamber within the case 1 is reduced. The force of the back-pressure spring 14 now overcomes the upward pressure against the diaphragm 13, causing the control rod 11 to descend. This moves the crank rod 10 to the oblique position, freeing the valve 5 which, actuated by the spring 8, moves to its seat 4. The spring 14 is calibrated so as to insure closing at a predetermined pressure below the normal operating pressure prevailing in the chamber when the gas flow is normal.

The pressure at which the valve will close may be easily adjusted by modifying the tension on the spring 14, for example, by screwing the lid 15 up or down.

While the pivot point of crank rod 10 on the control rod 11 is preferably located to be on the axis of movement of the valve spindle when the rod 11 is in its upper position, it is possible to locate the pivot slightly higher. This requires that the spring 14 be adjusted to a slightly higher tension for operation at the same low fluid pressure to compress spring 8 slightly in the first portion of its downward travel. This arrangement can be effected without change of the construction shown in the drawing by adjusting the discs 12 and 12a farther down on the wall.

I claim as my invention:

An automatic valve comprising a casing forming a pressure chamber, a movable pressure-responsive diaphragm forming one wall of the chamber, a back-pressure spring urging said diaphragm against the pressure of a fluid in said chamber, fluid inlet and outlet ports through said casing wall connecting with said chamber, a valve seat for said inlet port within said casing, a reciprocable valve stem having a longitudinal notched slide-way formed therein near one end and cooperating at the other end with said valve seat for closing said inlet port, said valve stem being mounted within said casing for movement substantially parallel to said diaphragm, a valve spring urging said valve stem to its seat, a control rod mounted within said chamber for reciprocating movement normal to the axis of motion of said valve, said control rod passing through said diaphragm to extend on either side thereof, said diaphragm being affixed in fluid-tight manner to said control rod and movable therewith, a link, a pivot pin affixed to one end of said link and slidably inserted within the slide-way for engagement with the notched end thereof, a connecting pin securing the other end of said link to the control rod within the chamber so as to cause an angular movement of the link and open the valve when the diaphragm and control rod are moved in opposition to the back-pressure spring.

LOUIS CALMELS.

REFERENCES CITED

The following references are of record in the file of this patent:

UNITED STATES PATENTS

| Number | Name | Date |
|---|---|---|
| 892,193 | Stanton | June 30, 1908 |
| 986,694 | Crookshank | Mar. 14, 1911 |
| 1,080,389 | Thayer | Dec. 2, 1913 |
| 1,681,041 | Kimbrough | Aug. 14, 1928 |

FOREIGN PATENTS

| Number | Country | Date |
|---|---|---|
| 14,725 | Great Britain | of 1891 |
| 16,194 | Great Britain | of 1910 |
| 290,116 | Great Britain | of 1928 |
| 321,340 | Great Britain | of 1928 |
| 373,422 | Italy | of 1939 |